(12) United States Patent
Schwartz et al.

(10) Patent No.: US 11,609,573 B2
(45) Date of Patent: Mar. 21, 2023

(54) METHOD FOR THE AUTOMATED DOCKING OF ROBOTIC PLATFORMS

(71) Applicant: FLORIDA POWER & LIGHT COMPANY, Juno Beach, FL (US)

(72) Inventors: Eric Schwartz, Palm Beach Gardens, FL (US); Stephen Cross, North Palm Beach, FL (US); Michael Gilbertson, Cooper City, FL (US); Kyle Bush, Palm Beach Gardens, FL (US); David Wendeborn, Portland, OR (US); Richard Armstrong, Portland, OR (US); Scott Nowicki, Portland, OR (US); Seth Hill, Portland, OR (US)

(73) Assignee: Florida Power & Light Company, Juno Beach, FL (US)

( * ) Notice: Subject to any disclaimer, the term of this patent is extended or adjusted under 35 U.S.C. 154(b) by 640 days.

(21) Appl. No.: 16/669,363

(22) Filed: Oct. 30, 2019

(65) Prior Publication Data
US 2020/0133287 A1 Apr. 30, 2020

Related U.S. Application Data

(60) Provisional application No. 62/752,968, filed on Oct. 30, 2018.

(51) Int. Cl.
*B60L 53/30* (2019.01)
*G05D 1/02* (2020.01)
*G05D 1/00* (2006.01)

(52) U.S. Cl.
CPC ............ *G05D 1/0225* (2013.01); *B60L 53/30* (2019.02); *G05D 1/0088* (2013.01)

(58) Field of Classification Search
None
See application file for complete search history.

(56) References Cited

U.S. PATENT DOCUMENTS

| | | | |
|---|---|---|---|
| 5,088,320 A | * | 2/1992 | Fukuda ............ G01M 17/0072 33/203.13 |
| 9,276,419 B2 | | 3/2016 | Borinato et al. |

(Continued)

OTHER PUBLICATIONS

Non-Final Office Action received for U.S. Appl. No. 16/130,989 dated Oct. 7, 2019, 12 pages.

(Continued)

*Primary Examiner* — James M McPherson
(74) *Attorney, Agent, or Firm* — Fleit Intellectual Property Law; Thomas Grzesik

(57) ABSTRACT

Various embodiments are directed to a method for docking a robotic platform. The method may include receiving a robotic platform onto a ramp of a docking station. The docking station may include the ramp, a roller assembly, a base pad, and a roller backstop assembly. The ramp may have a first side and a second side opposing the first side. The method may further include guiding, by the roller assembly, the robotic platform as the robotic platform is being driven onto ramp such that the robotic platform continues powered travel over the ramp when the robotic platform approaches the ramp within an angle range of 0 and 15 degrees with respect to either of the first and second sides of the ramp. The method may further include receiving, by the roller backstop assembly, the robotic platform from the roller assembly and then docking the robotic platform.

20 Claims, 7 Drawing Sheets

(56) References Cited

U.S. PATENT DOCUMENTS

| | | |
|---|---|---|
| 9,462,920 B1* | 10/2016 | Morin .................... A47L 9/2842 |
| 10,737,395 B2* | 8/2020 | Wolff ...................... A47L 9/009 |
| 2005/0156562 A1 | 7/2005 | Cohen et al. |
| 2008/0028974 A1 | 2/2008 | Bianco |
| 2009/0044370 A1* | 2/2009 | Won ........................ A47L 9/106 |
| | | 15/319 |
| 2012/0102670 A1 | 5/2012 | Jang et al. |
| 2016/0183752 A1* | 6/2016 | Morin ....................... A47L 9/00 |
| | | 15/340.1 |
| 2017/0072558 A1 | 3/2017 | Reynolds et al. |
| 2018/0014709 A1 | 1/2018 | O'Brien et al. |
| 2018/0188737 A1 | 7/2018 | Won et al. |
| 2018/0228335 A1* | 8/2018 | Miller ....................... A47L 5/14 |
| 2019/0133399 A1* | 5/2019 | Morin ................... A47L 9/2842 |
| 2019/0181666 A1* | 6/2019 | Hayashi ................. A63H 11/00 |
| 2019/0202064 A1* | 7/2019 | Wolff ....................... A47L 5/22 |

OTHER PUBLICATIONS

Notice of Allowance received for U.S. Appl. No. 16/130,989 dated Jan. 30, 2020, 6 pages.

\* cited by examiner

METHOD FOR THE AUTOMATED DOCKING OF ROBOTIC PLATFORMS

CROSS REFERENCE TO RELATED APPLICATION

This application claims the benefit of U.S. Provisional Application No. 62/752,968, filed Oct. 30, 2018, the disclosure of which is incorporated, in its entirety, by this reference.

TECHNICAL FIELD

Embodiments of the disclosure relate generally to automating the docking of robotic platforms and more specifically to a docking station that facilitates the automated docking of robotic platforms for charging operations.

BACKGROUND

Infrastructure facilities such as electrical substations and water utility facilities frequently require on-site inspection for maintenance and repair operations associated with the failure of individual components due to natural corrosion over time, defects, event-induced equipment breakage and/or equipment overloading that may cause major disruption to operations, loss of revenue, and significant replacement costs. Advances in autonomous technology have resulted in the increasing use of wheeled robotic platforms to carry out inspection tasks previously performed manually.

Robotic platforms, in performing their assigned inspection tasks, have a need for replenishing their power source which is usually accomplished by programming the platforms to dock with a power source for charging. Traditionally, robotic platforms utilize various localization sensors (e.g., GPS, imaging, LiDAR and/or SONAR sources) in addition to complex software to initiate a docking sequence with a charging system. The aforementioned sensors and software however, have varying levels of precision that often result in the inaccurate docking of autonomous robotic platforms. This problem is further exacerbated when robotic platforms are utilized in outdoor environments where various environmental factors (e.g., mud, snow, rain, gravel, etc.) may cause further errors in localization based on the configuration of localization sensors for ideal (e.g., indoor) conditions. It is with respect to these considerations and others that the various embodiments of the present invention have been made.

SUMMARY

As will be described in greater detail below, the instant disclosure generally relates to a method for the docking of robotic platforms. In one example, the method may include receiving a robotic platform onto a ramp of a docking station. The docking station may include the ramp, a roller assembly, a base pad, and a roller backstop assembly. The ramp may have a first side and a second side opposing the first side. The method may further include guiding, by the roller assembly, the robotic platform as the robotic platform is being driven onto ramp such that the robotic platform continues powered travel over the ramp when the robotic platform approaches the ramp within an angle range of 0 and 15 degrees with respect to either of the first and second sides of the ramp. The method may further include receiving, by the roller backstop assembly, the robotic platform from the roller assembly. The method may further include docking the robotic platform.

In some examples, the roller assembly may include a first group of alignment members that (1) receives a set of wheels of the robotic platform as the robotic platform approaches the ramp and (2) aligns the wheels in a substantially forward direction of travel on the ramp when the wheels are received within the angle range of 0 and 15 degrees with respect to either of the first and second sides of the ramp. In some embodiments, each of the first group of alignment members may include a frame and a roller attached to the frame. In one example, the first group of alignment members may be oriented in a V-formation on the ramp. In some examples, the roller assembly may further include a second group of alignment members coupled to the first group of alignment members, the ramp, and the base pad, where the second group of alignment members (1) receives the wheels of the robotic platform from the first plurality of alignment members and (2) maintains the alignment of the wheels in the substantially forward direction of travel onto the base pad from the ramp for engagement with the roller backstop assembly.

In some embodiments, the roller backstop assembly may include a third group of alignment members and a stopping member, where the third group of alignment members may (1) receive the set of wheels of the robotic platform from the second group of alignment members on the base pad and (2) maintain the alignment of the wheels in the substantially forward direction of travel for engagement with the stopping member. In some embodiments, the stopping member may be oriented vertically relative to the base pad at a height greater than a radius of the wheels of the robotic platform such that further movement of the robotic platform is prevented.

In some examples, each of the third group of alignment members may include a frame and a roller attached to the frame. In some embodiments, the stopping member may include a roller. In some examples, the roller backstop assembly may include a docking arm assembly that docks the robotic platform. In some embodiments, the docking arm assembly may include a charge plate assembly that engages a receiver on the robotic platform to charge the robotic platform when the robotic platform is docked.

In some examples, the instant disclosure presents method that may include receiving a robotic platform onto a ramp of a docking station including the ramp, a roller assembly, a base pad, a roller backstop assembly, and a power station. The ramp may have a first side and a second side opposing the first side. The method may further include guiding, by the roller assembly, the robotic platform as the robotic platform is being driven onto ramp such that the robotic platform continues powered travel over the ramp when the robotic platform approaches the ramp within an angle range of 0 and 15 degrees with respect to either of the first and second sides of the ramp. The method may further include receiving, by the roller backstop assembly, the robotic platform from the roller assembly. The roller backstop assembly may include a docking arm assembly that docks the robotic platform. The method may further include charging, by the power station, the robotic platform when the robotic platform is docked in the docking station.

In some examples, the instant disclosure presents method that may include receiving a robotic platform onto a ramp of a docking station including the ramp, a roller assembly, a base pad, a roller backstop assembly, and a power station. The ramp may have a first side and a second side opposing the first side. The method may further include guiding, by the roller assembly, the robotic platform as the robotic platform is being driven onto ramp such that the robotic platform continues powered travel over the ramp when the robotic platform approaches the ramp within an angle range of 0 and 15 degrees with respect to either of the first and second sides of the ramp, where the roller assembly may include a group of alignment members that (1) receives a set of wheels of the robotic platform as the robotic platform approaches the ramp and (2) aligns the wheels in a substantially forward direction of travel on the ramp when the wheels are received within the angle range of 0 and 15 degrees with respect to either of the first and second sides of the ramp. The method may further include receiving, by the roller backstop assembly, the robotic platform from the roller assembly. The roller backstop assembly may include a docking arm assembly that docks the robotic platform. The method may further include charging, by the power station, the robotic platform when the robotic platform is docked in the docking station.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

DETAILED DESCRIPTION

The present disclosure describes a method that allows a wheeled robotic platform to automatically and accurately dock in a docking station for charging operations when the robotic platform approaches a ramp of the docking station within a predetermined angle range. The embodiments of the disclosure described herein provide several advantages over traditional methods. By providing a configuration of a docking station ramp and a docking station roller assembly that enables a robotic platform being driven towards the docking station to continue powered travel into the docking station for accurate docking (e.g., engagement with a docking arm assembly) when approaching the docking station ramp within a predetermined angle range with respect to either side of the ramp, traditional positioning methods (e.g., utilizing electronic hardware and/or software means) that may often result in the erroneous docking of robotic platforms (e.g., due to the accuracy of localization sensors being affected by configuration and/or environmental factors) are no longer needed. Moreover, the components of the aforementioned mechanical system may be implemented at a lower cost than high-end electronic positioning hardware and software and is adaptable to nearly any type of wheeled robotic platform.

Embodiments of the disclosure now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
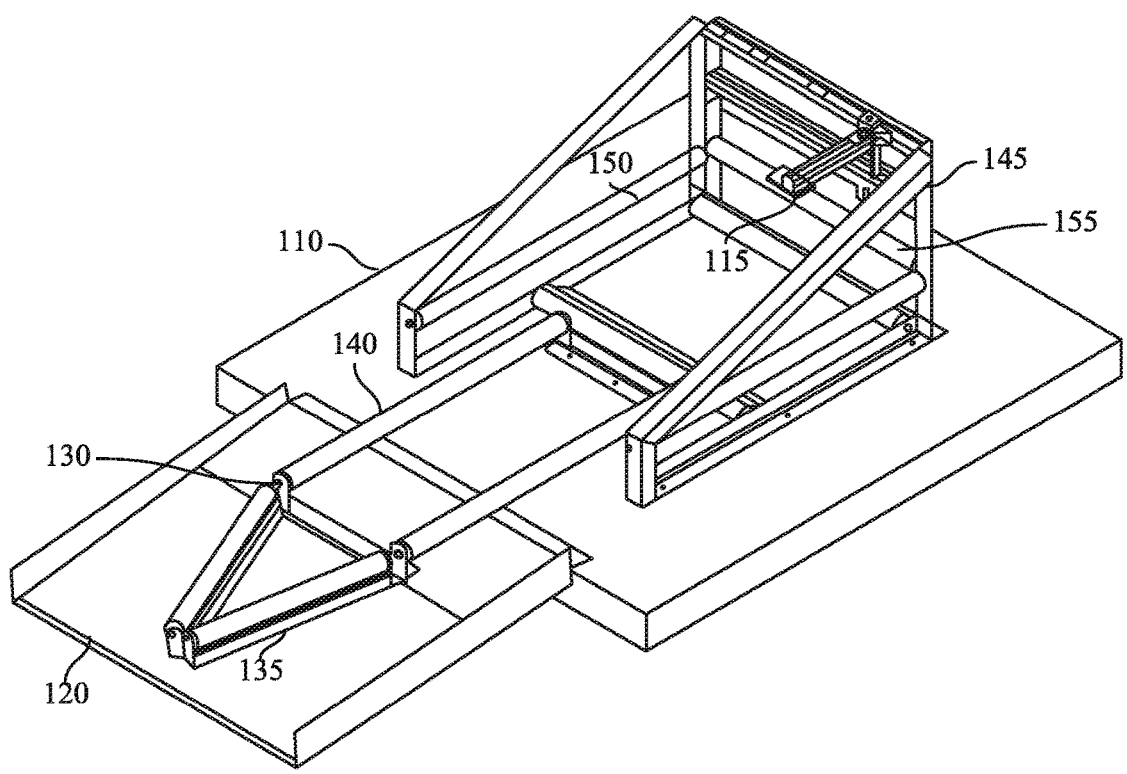
FIG. 1 illustrates a diagram showing a perspective view of an example docking station the docking of robotic platforms, according to an example embodiment.

FIG. 1 illustrates a diagram of an example docking station 100 for the docking of robotic platforms. In some examples, docking station 100 may include a base pad 110, a ramp 120, a roller assembly 130, and a roller backstop assembly 145.

In one embodiment, roller assembly 130 may be coupled to ramp 120 and base pad 110. Roller assembly 130 may include alignment members 135 coupled to alignment members 140. In some examples, alignment members 135 may be configured to receive a set of wheels of a robotic platform as the robotic platform approaches (i.e., when the wheels begin to make contact) with ramp 120 and further configured to align the wheels in a substantially forward direction of travel on ramp 120 when the wheels are received within an angle range of 0 and 15 degrees with respect to either side of ramp 120. In some examples, alignment members 135 may be arranged in a "V" formation to facilitate receiving the robotic platform wheels at an approach angle of between 0 and 15 degrees. In one embodiment, each of alignment members 135 may be a stainless-steel roller attached to a frame to prevent gripping when coming into contact with the robotic platform wheels. In other examples, alignment members 135 may be constructed of other materials having a low coefficient of friction including, without limitation, TEFLON coated plates, a collection of small stainless-steel bearing balls or beads, etc.

In some embodiments, alignment members 140 of roller assembly 130 may be configured to receive the robotic platform wheels from alignment members 135 and further configured to maintain the alignment of the robotic platform wheels in a substantially forward direction of travel onto base pad 110 from ramp 120 for engagement with roller backstop assembly 145. In some embodiments, each of alignment members 140 may be a stainless-steel roller attached to a frame to prevent gripping when coming into contact with the robotic platform wheels. In other examples, alignment members 140 may be constructed of other materials having a low coefficient of friction including, without limitation, TEFLON coated plates, a collection of small stainless-steel bearing balls or beads, etc. In one example, alignment members 140 may be coupled to the "wide" end of the V-shaped rollers making up alignment members 135 via a spring-loaded mechanism to allow for a degree of flex (e.g., bending) between the V-shaped rollers and the rollers making up the alignment members 140.

In some embodiments, roller backstop assembly 145 may include a frame having two sloped side members connected to a back member which together may form a cavity for receiving a robotic platform. The sloped side members may be connected by a horizontal roller coupled to base pad 110.

The horizontal roller connecting the sloped side members may also be coupled to alignment members 140 of roller assembly 130. Each of the sloped side members of roller backstop assembly 145 may include alignment members 150 and a stopping member 155. In one example, alignment members 150 may be configured to receive the robotic platform wheels from alignment members 140 on base pad 110 and further configured to maintain the alignment of the robotic platform wheels in a substantially forward direction of travel for engagement with stopping member 155 so as to prevent further travel (i.e., movement) of the robotic platform wheels. In some examples, stopping member 155 may be vertically oriented relative to base pad 110 at a height greater than a radius of the robotic platform wheels. In some embodiments, each of alignment members 150 may be a stainless-steel roller attached to a frame to prevent gripping when coming into contact with the robotic platform wheels. In other examples, alignment members 150 may be constructed of other materials having a low coefficient of friction including, without limitation, TEFLON coated plates, a collection of small stainless-steel bearing balls or beads, etc. In one example, the stainless-steel rollers may be positioned at a height corresponding to approximately a midpoint of a wheel height of the robotic platform. In some examples, the rollers may assist in aligning and/or guiding the wheels of the robotic platform in a substantially forward direction as the robotic platform travels on base pad 110 for charging operations. Moreover, in some examples, stopping member 155 may also be a stainless-steel roller attached to a frame. In other examples, stopping member 155 may be constructed of other materials having a low coefficient of friction including, without limitation, TEFLON coated plates, a collection of small stainless-steel bearing balls or beads, etc. In one example, stopping member 155 may be positioned at a height corresponding to the top of a wheel height of the robotic platform. In some examples, stopping member 155 may assist in stopping the forward travel of a robotic platform on base pad 110 such that it may be accurately positioned for docking and/or engaging with a charging station for charging operations. For example, stopping member 155, upon coming in contact with a robotic platform, may provide a stopping force to prevent further travel of the robotic platform while will allowing rotation of its wheels.

In some embodiments, roller backstop assembly 145 may further include a docking arm assembly 115 for docking a robotic platform. In one example, docking arm assembly 115 may extend from the back member of roller backstop assembly 145 (thereby forming a "T") into the cavity formed by the sloped side members and the back member of roller backstop assembly 145. In some examples, docking arm assembly 115 may be constructed of 80-20 aluminum extrusion T-slot rail components. As will be described in greater detail below, docking arm assembly 115 may include or be coupled to a charge plate assembly that engages a receiver on the robotic platform for charging operations when the robotic platform is docked in docking station 100.

In some examples, base pad 110 may be coupled to roller backstop assembly 145 avia concrete anchors. In some examples, base pad 110 and ramp 120 may be constructed from sheets of ultra high molecular weight polyethylene (UHMW) thereby providing a robust low friction surface for the robotic platform to maneuver upon. For example, the low friction surface of base pad 110 and ramp 120 may allow the wheels on a skid steer robotic platform to slip laterally while roller assembly 130 the roller backstop assembly 145 align its wheels to maneuver into the cavity formed by roller backstop assembly 145 until the robotic platform reaches stopping member 155 such that its charging receiver is positioned to contact with a charge plate assembly coupled to docking arm assembly 115.

Figure 2:
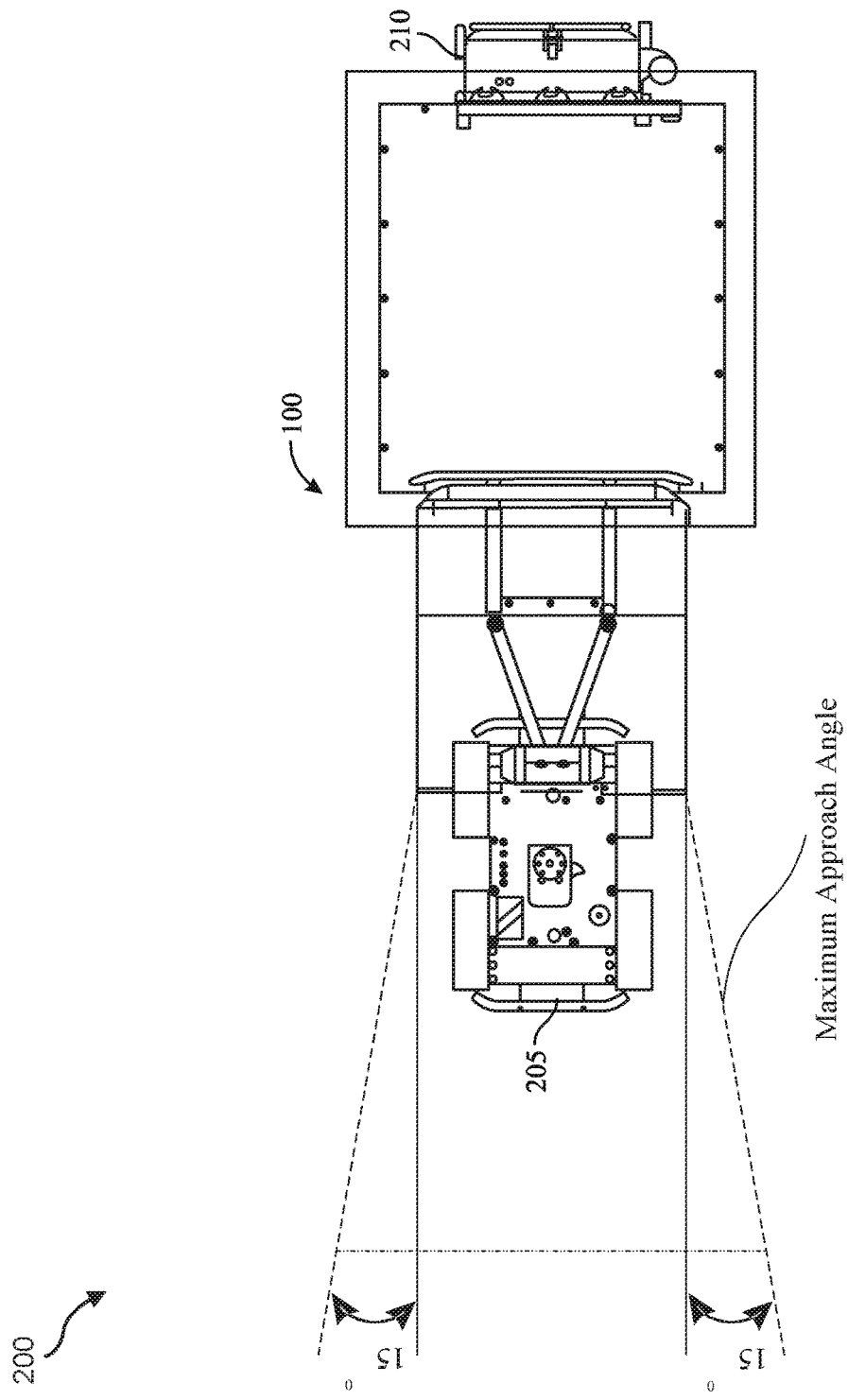
FIG. 2 illustrates a diagram showing a top view of an example system for the docking of robotic platforms, according to an example embodiment.

FIG. 2 illustrates a diagram of a top view of an example system 200 for the docking of robotic platforms, according to an example embodiment. As shown in FIG. 2, system 200 may include a robotic platform 205 and docking station 100 (described in detail above with respect to FIG. 1). As discussed above, the alignment members of the roller assembly (e.g., alignment members 135 of roller assembly 130 in FIG. 1) may be configured to receive a set of wheels of robotic platform 205 as robotic platform 205 approaches (i.e., when the wheels begin to make contact) with the ramp of docking station 100 and further configured to align the wheels in a substantially forward direction of travel on the ramp when the wheels are received within an angle range of 0 and 15 degrees (with 15 degrees being the maximum approach angle) with respect to either side of the ramp. After robotic platform 205 has been received in docking station 100, robotic platform 205 may be docked and further (while docked) engage in charging operations with power being supplied by a power station 210 coupled to docking station 100. In some examples, power station 210 may include one or more direct current (DC) power supplies enclosed in a charging assembly enclosure coupled to the back of docking station 100. In some embodiments (as shown in FIG. 2), docking station 100 may further include a housing coupled to the roller backstop assembly and the base pad that may be utilized to cover robotic platform 205 when docked.

Figure 3:
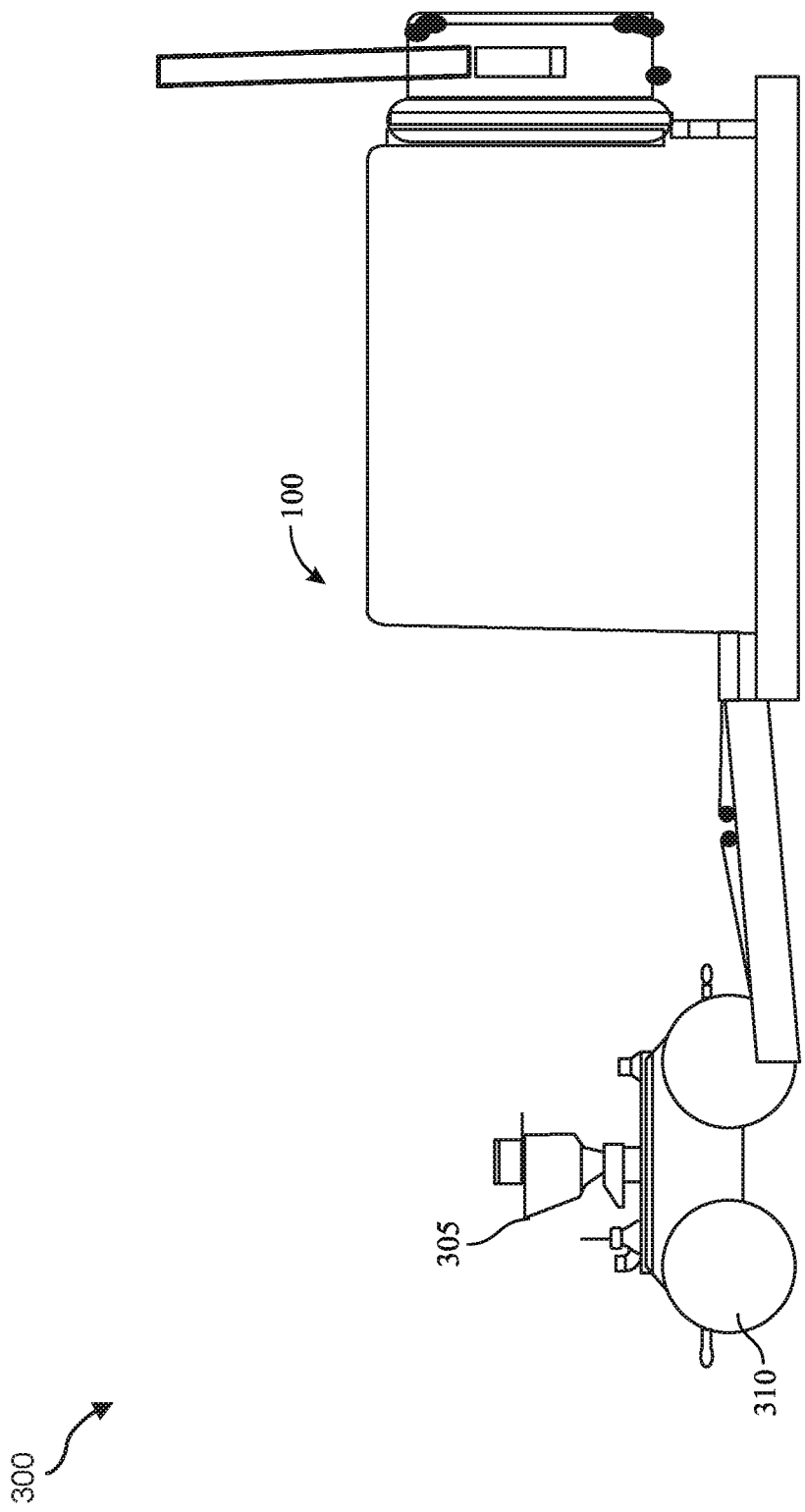
FIG. 3 illustrates a diagram showing a side view of an example system for the docking of robotic platforms, according to an example embodiment.

FIG. 3 illustrates a diagram of a side view of an example system 300 for the docking of robotic platforms, according to an example embodiment. As shown in FIG. 3, system 300 may include a robotic platform 305 and docking station 100 (described in detail above with respect to FIGS. 1 and 2). As discussed above, the alignment members of the roller assembly (e.g., alignment members 135 of roller assembly 130 in FIG. 1) may be configured to receive a set of wheels 310 of robotic platform 305 as robotic platform 305 approaches (i.e., when the wheels begin to make contact) with the ramp of docking station 100 and further configured to align the wheels in a substantially forward direction of travel on the ramp when the wheels are received within an angle range of 0 and 15 degrees (with 15 degrees being the maximum approach angle) with respect to either side of the ramp. After robotic platform 305 has been received in docking station 100, robotic platform 305 may be docked.

Figure 4:
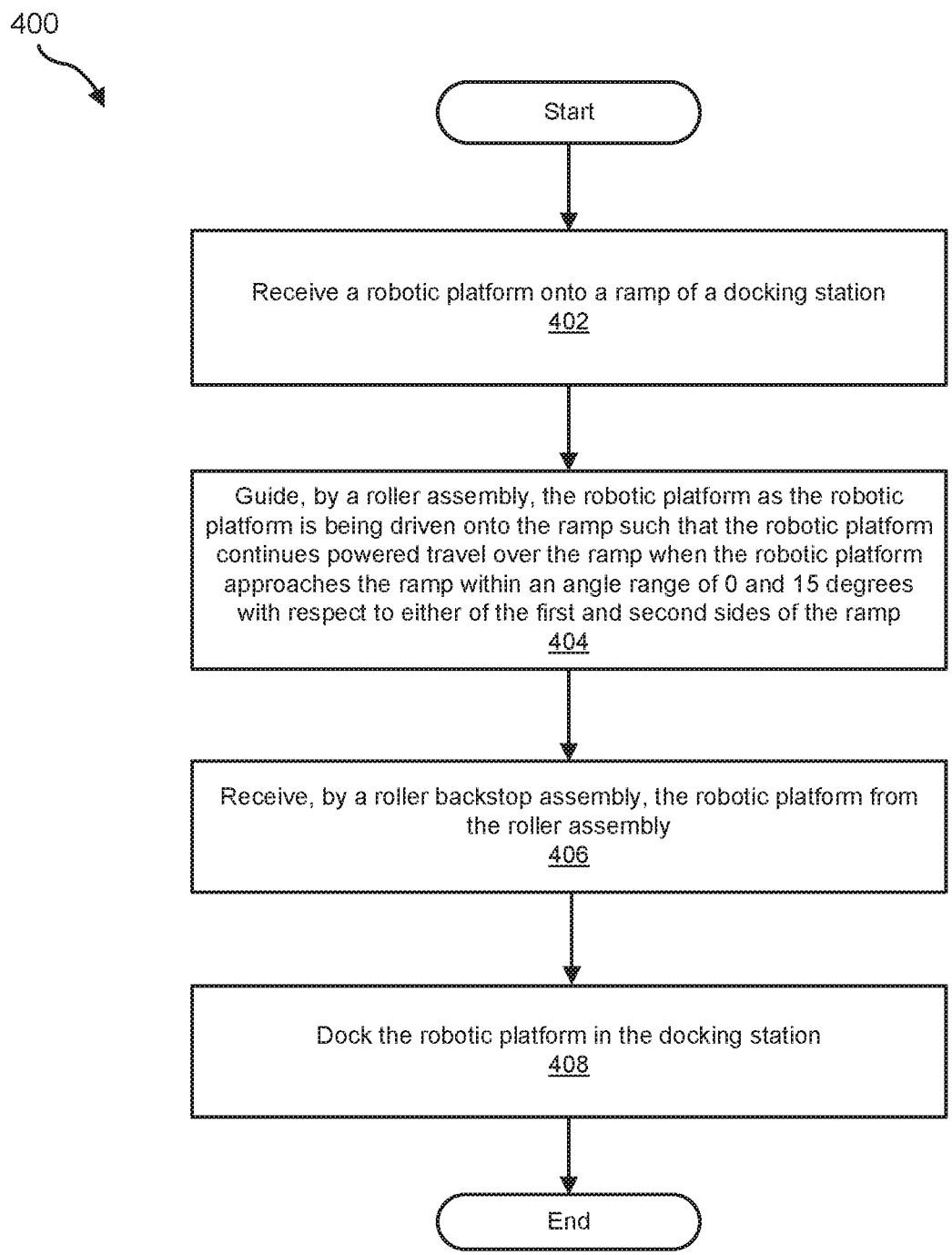
FIG. 4 is a flow diagram illustrating a method for docking a robotic platform, according to an example embodiment.

FIG. 4 is a flow diagram of an example method 400 for docking a robotic platform. As illustrated in FIG. 4, at step 402 one or more of the systems described herein may receive a robotic platform onto a ramp of a docking station. For example, the ramp of docking station 100 in the system 200 of FIG. 2, may receive robotic platform 205 for docking.

At step 404, one or more of the systems described herein may guide, by a roller assembly, the robotic platform as the robotic platform is being driven onto ramp such that the robotic platform continues powered travel over the ramp when the robotic platform approaches the ramp within an angle range of 0 and 15 degrees with respect to either side of the ramp. For example, roller assembly 130 of FIG. 1 may guide robotic platform 205 as robotic platform 205 is being driven onto the ramp of docking station 100 such that robotic platform 205 continues powered travel over the ramp when robotic platform 205 approaches the ramp within an angle range of 0 and 15 degrees with respect to either side of the ramp. In one embodiment, alignment members 135 of roller assembly 130 may be configured to receive a set of wheels of robotic platform 205 as robotic platform 205 approaches (i.e., when the wheels begin to make contact) with the ramp and further configured to align the wheels in a substantially forward direction of travel on the ramp when the wheels are received within an angle range of 0 and 15 degrees with respect to either side of ramp. In some examples, alignment members 135 may be arranged in a "V" formation to facilitate receiving the robotic platform wheels at an approach angle of between 0 and 15 degrees.

At step 406, one or more of the systems described herein may receive, by a roller backstop assembly, the robotic platform from the roller assembly. For example, roller backstop assembly 145 of FIG. 1 may receive robotic platform 205 from roller assembly 130 for docking. In one embodiment, roller backstop assembly 145 may include a docking arm assembly 115 for docking the robotic platform.

At step 408, one or more of the systems described herein may dock the robotic platform in the docking station. For example, docking arm assembly 115 of FIG. 1 may include or be coupled to a charge plate assembly that engages a receiver on robotic platform 205 for both docking and charging robotic platform 205 in docking station 100. In some examples, power station 210 of FIG. 2 may be utilized to supply power to the charge plate assembly to charge robotic platform 205 when the receiver on robotic platform 205 is engaged with the charge plate assembly (i.e., docked) on docking arm assembly 115.

Figure 5:
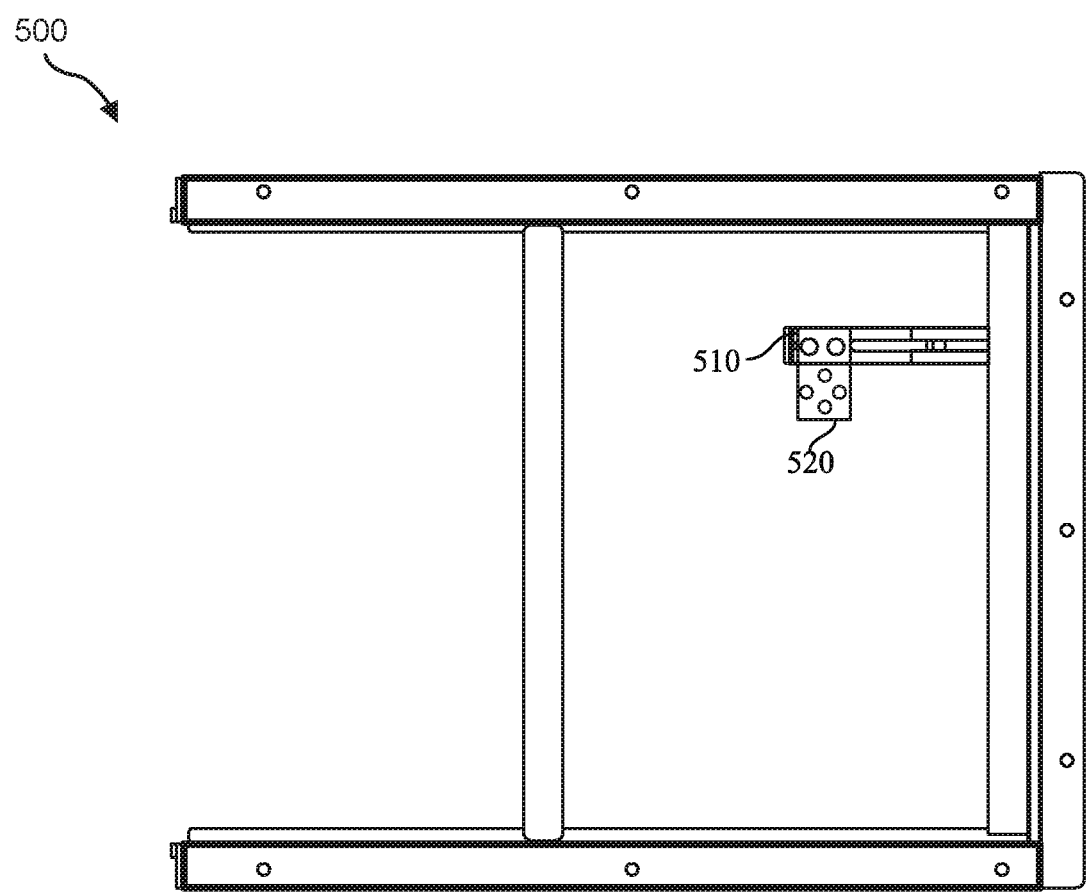
FIG. 5 illustrates a diagram showing a top view of an example docking station for the docking of robotic platforms, according to an example embodiment.
Figure 6:
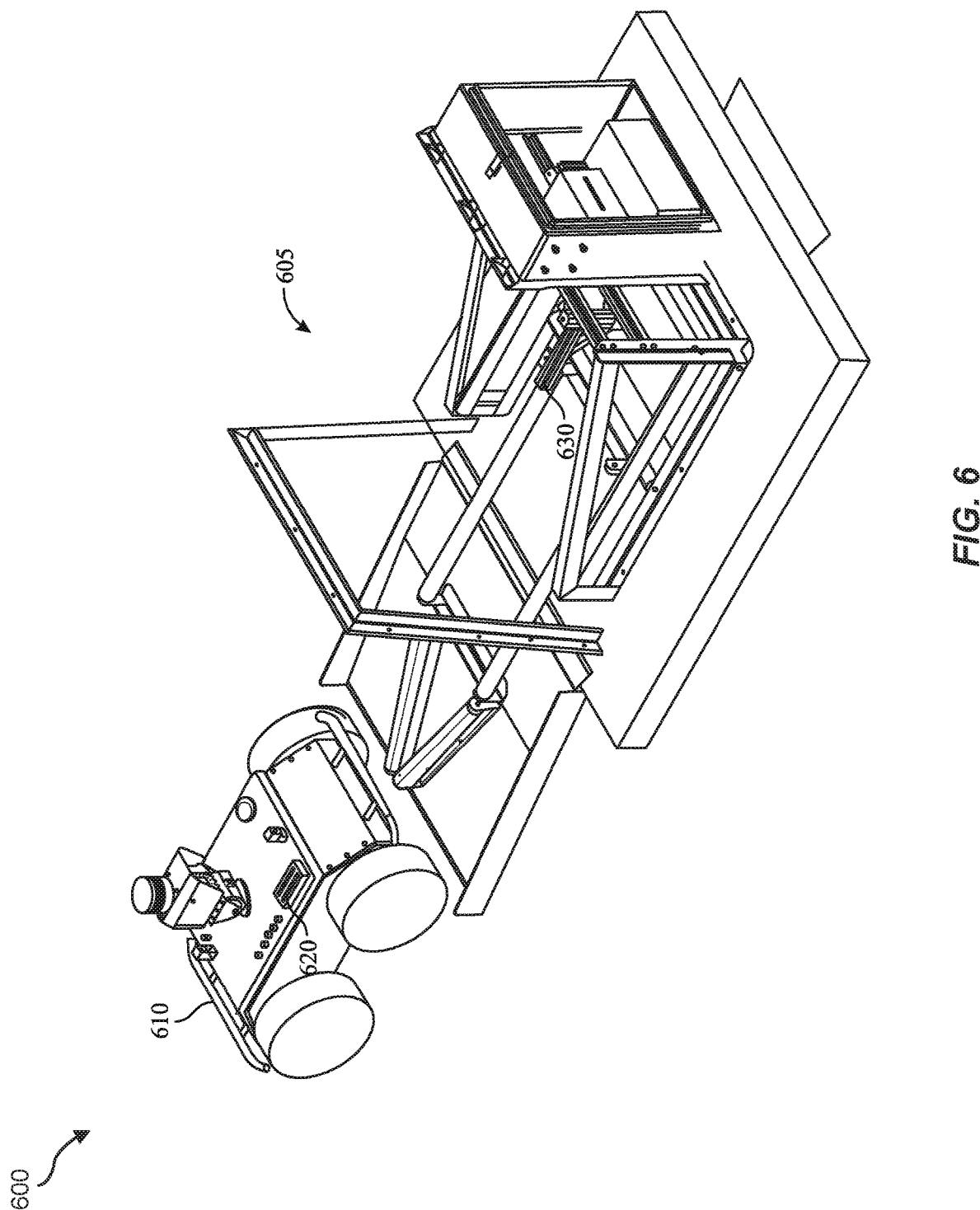
FIG. 6 illustrates a diagram showing a perspective view of an example system for the docking of robotic platforms, according to an example embodiment.
Figure 7:
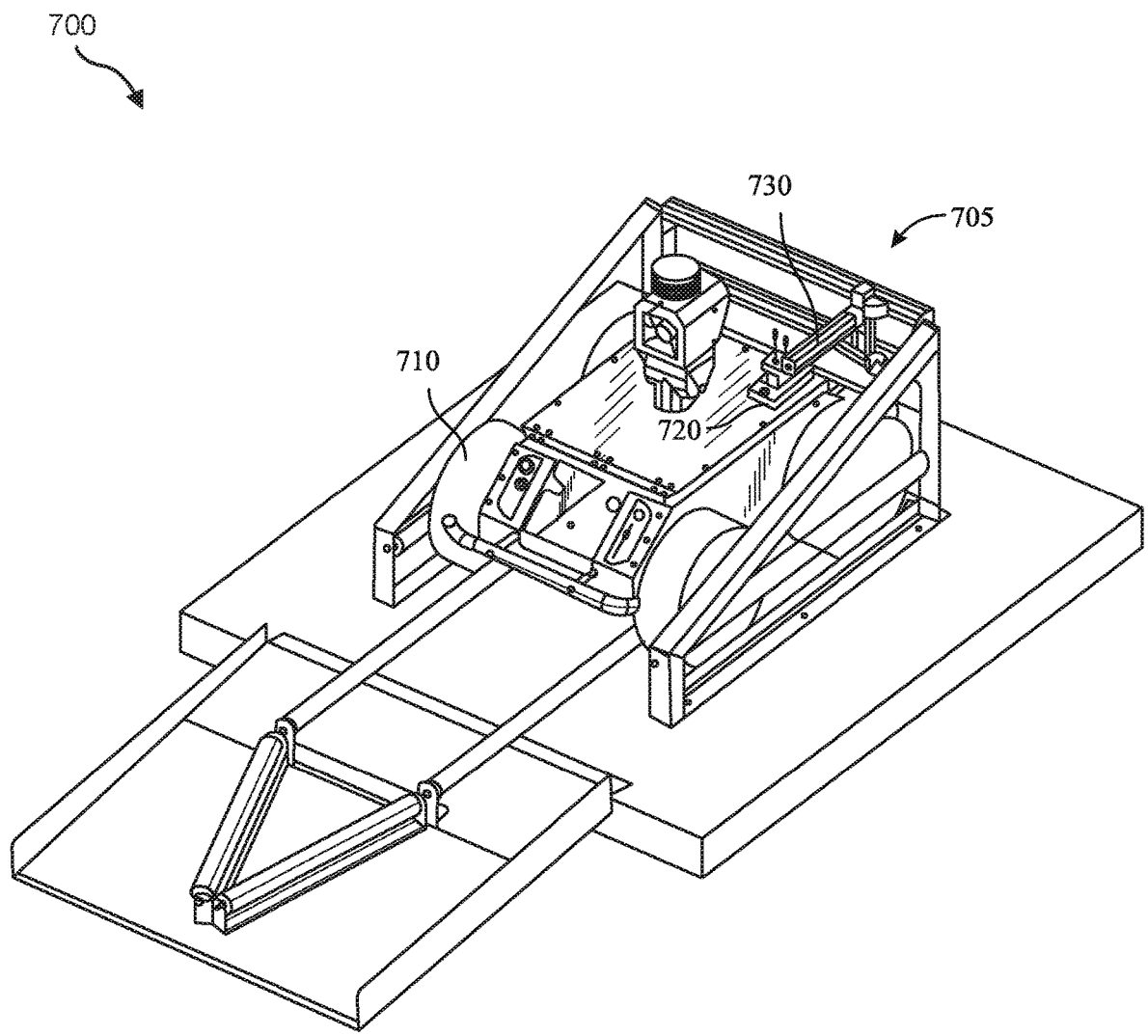
FIG. 7 illustrates a diagram showing another perspective view of an example system for the docking of robotic platforms, according to an example embodiment.

FIG. 5 illustrates a diagram of a top view of an example docking station 500 for the docking of robotic platforms, according to an example embodiment. As shown in FIG. 5, docking station 500 may include a docking arm assembly 510 utilized to dock a robotic platform for charging operations. In some examples, docking arm assembly 510 may include (or be coupled to) a charge plate assembly 520. In some examples, charge plate assembly 520 may be configured to engage with a charging receiver on a robotic platform when the robotic platform is docked inside of docking station 500. For example, and turning now to FIG. 6, a system 600 is shown that includes a robotic platform 610 with a charging receiver 620 for charging robotic platform 610 when it is docked via docking arm assembly 630 in a docking station 605. As a further example, and turning now to FIG. 7, a system 700 is shown that includes a robotic platform 710 docked inside of a docking station 705. In this example, a charging receiver 720 on robotic platform 710 may be engaged with a docking arm assembly 730 in docking station 705. In some examples, docking arm assembly 730 may include or be coupled to a charge plate assembly that may be electrically connected to a power station (e.g., power station 210 of FIG. 2) for providing power to robotic platform 710 via charging receiver 720. In some examples, the power station may include one or more DC power supplies enclosed in a charging assembly enclosure coupled to the back of docking station 705 and electrically connected to the charge plate assembly.

The term "robotic platform" as used herein, generally refers to any form of machine, programmable by a computer, capable of autonomously or semi-autonomously carrying out a complex series of actions or tasks such as facility inspections. Examples of programmable mobile machines include, without limitation, robots, aquatic mobility systems (e.g., autonomous surface vehicles), and/or surface-based mobility systems (e.g., unmanned ground vehicles (UGVs) including autonomous cars, etc.) that are capable of directional movement on the ground or on water.

The robotic platforms disclosed herein may be utilized in a variety of environments and conditions, including, for example facility substations (e.g., electrical and/or water utility substations), data centers, industrial environments (e.g., factories, plants, etc.), warehouses (e.g., storage warehouses, shipping warehouses, etc.), construction sites, buildings, outdoor spaces, and/or any other suitable environment or location, without limitation.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   receiving a robotic platform onto a docking station, the docking station comprising a ramp, a roller assembly having a first plurality of alignment members, a base pad, and a roller backstop assembly having a second plurality of alignment members, wherein the first plurality of alignment members extend, at least partially, over the ramp and the base pad, and wherein the second plurality of alignment members extend over the base pad and outside of the first plurality of alignment members;
   guiding, by the first plurality of alignment members, the robotic platform so as to guide the robotic platform from the ramp to the base pad such that the robotic platform continues powered travel from the ramp onto the base pad;
   receiving, by the second plurality of alignment members, the robotic platform from the first plurality of alignment members so that a set of wheels of the robotic platform are interposed between the first plurality of alignment members and the second plurality of alignment members and at least a portion of the set of wheels remain in contact with at least one of the first plurality of alignment members or second plurality of alignment members; and
   docking the robotic platform in the docking station.

2. The method of claim 1, wherein the roller assembly comprises a third plurality of alignment members that:
   receives the set of wheels of the robotic platform as the robotic platform approaches the ramp; and
   aligns the set of wheels in a forward direction of travel on the ramp when the set of wheels are received.

3. The method of claim 2, wherein each of the third plurality of alignment members comprises a frame and a roller attached to the frame.

4. The method of claim 2, wherein the third plurality of alignment members are oriented in a V-formation on the ramp.

5. The method of claim 2, wherein the first plurality of alignment members is coupled to the third plurality of alignment members, the ramp, and the base pad, wherein the first plurality of alignment members receives the set of wheels of the robotic platform from the third plurality of alignment members and maintains the alignment of the set of wheels in the forward direction of travel onto the base pad from the ramp for engagement with the roller backstop assembly.

6. The method of claim 5, wherein the roller backstop assembly comprises a stopping member, and wherein the second plurality of alignment members maintains the set of wheels in the forward direction of travel for engagement with the stopping member, wherein the stopping member is oriented vertically relative to the base pad at a height greater than a radius of the set of wheels of the robotic platform, and wherein the stopping member prevents further movement of the robotic platform.

7. The method of claim 6, wherein each of the third second plurality of alignment members comprises a frame and a roller attached to the frame.

8. The method of claim 6, wherein the stopping member comprises a roller.

9. The method of claim 1, wherein the roller backstop assembly comprises a docking arm assembly that docks the robotic platform.

10. The method of claim 9, wherein the docking arm assembly comprises a charge plate assembly that engages a receiver on the robotic platform to charge the robotic platform when the robotic platform is docked.

11. A method comprising:
receiving a robotic platform onto a docking station, the docking station comprising a ramp, a roller assembly having a first plurality of alignment members, a base pad, a roller backstop assembly having a second plurality of alignment members, and a power station, wherein the first plurality of alignment members extend, at least partially, over the ramp and the base pad, and wherein the second plurality of alignment members extend over the base pad and outside of the first plurality of alignment members;
guiding, by the first plurality of alignment members, the robotic platform so as to guide the robotic platform from the ramp to the base pad such that the robotic platform continues powered travel from the ramp onto the base pad;
receiving, by the second plurality of alignment members, the robotic platform from the first plurality of alignment members so that a set of wheels of the robotic platform are interposed between the first plurality of alignment members and the second plurality of alignment members and at least a portion of the set of wheels remain in contract with at least one of the first plurality of alignment members or second plurality of alignment members;
docking the robotic platform in the docking station; and
charging, by the power station, the robotic platform when the robotic platform is docked in the docking station.

12. The method of claim 11, wherein the roller assembly comprises a third plurality of alignment members that:
receives the set of wheels of the robotic platform as the robotic platform approaches the ramp; and
aligns the set of wheels in a forward direction of travel on the ramp when the set of wheels are received.

13. The method of claim 12, wherein each of the third plurality of alignment members comprises a frame and a roller attached to the frame.

14. The method of claim 12, wherein the third plurality of alignment members are oriented in a V-formation on the ramp.

15. The method of claim 12, wherein the first plurality of alignment members is coupled to the third plurality of alignment members, the ramp, and the base pad.

16. The method of claim 15, wherein the roller backstop assembly further comprises a stopping member, and wherein the first plurality of alignment members maintains the set of wheels in the forward direction of travel for engagement with the stopping member, wherein the stopping member is oriented vertically relative to the base pad at a height greater than a radius of the set of wheels of the robotic platform, and wherein the stopping member prevents further movement of the robotic platform.

17. The method of claim 16, wherein each of the first plurality of alignment members comprises a frame and a roller attached to the frame.

18. The method of claim 16, wherein the stopping member comprises a roller.

19. The method of claim 11, wherein the roller backstop assembly comprises a docking arm assembly, the docking arm assembly comprising a charge plate assembly that engages a receiver on the robotic platform to charge the robotic platform when the robotic platform is docked.

20. A method comprising
receiving a robotic platform onto a docking station, the docking station comprising a ramp, a roller assembly having a first plurality of alignment members, a base pad, a roller backstop assembly having a second plurality of alignment members, and a power station, wherein the first plurality of alignment members extend, at least partially, over the ramp and the base pad, and wherein the second plurality of alignment members extend over the base pad and outside of the first plurality of alignment members;
guiding, by the first plurality of alignment members, the robotic platform so as to guide the robotic platform from the ramp to the base pad such that the robotic platform continues powered travel from the ramp onto the base pad, wherein the second plurality of alignment members:
receives, from the first plurality of alignment members, a set of wheels of the robotic platform as the robotic platform approaches the ramp so that the set of wheels of the robotic platform are interposed between the first plurality of alignment members and the second plurality of alignment members and at least a portion of the set of wheels remain in contact with at least one of the first plurality of alignment members or second plurality of alignment members;
wherein the roller backstop assembly comprises a docking arm assembly that docks the robotic platform, and the first plurality of alignment members receives the set of wheels of the robotic platform from a third plurality of alignment members to maintain the set of wheels in a forward direction of travel for engagement with a stopping member of the roller backstop assembly, wherein the stopping member is oriented vertically relative to the base pad at a height greater than a radius of the set of wheels of the robotic platform, and wherein the stopping member prevents further movement of the robotic platform;
docking the robotic platform in the docking station; and charging, by the power station, the robotic platform when the robotic platform is docked in the docking station.

* * * * *